United States Patent

Biebl

Patent Number: 5,911,157
Date of Patent: Jun. 8, 1999

[54] TUNNEL EFFECT SENSOR

[75] Inventor: Markus Biebl, Augsburg, Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/676,198

[22] PCT Filed: Jan. 10, 1995

[86] PCT No.: PCT/DE95/00020

§ 371 Date: Jul. 17, 1996

§ 102(e) Date: Jul. 17, 1996

[87] PCT Pub. No.: WO95/19571

PCT Pub. Date: Jul. 20, 1995

[30] Foreign Application Priority Data

Jan. 18, 1994 [DE] Germany ............... 44 01 303

[51] Int. Cl.[6] ................................ G01P 1/02
[52] U.S. Cl. ................ 73/514.16; 73/862.625
[58] Field of Search ............ 73/514.16, 514.32, 73/514.36, 514.18, 514.38, 862.625; 437/228; 324/244; 250/306

[56] References Cited

U.S. PATENT DOCUMENTS

| | | | |
|---|---|---|---|
| 5,211,051 | 5/1993 | Kaiser et al. | 73/514.38 |
| 5,265,470 | 11/1993 | Kaiser et al. | 73/862.625 |
| 5,285,686 | 2/1994 | Peters | 73/504.15 |
| 5,315,247 | 5/1994 | Kaiser et al. | 324/244 |
| 5,431,051 | 7/1995 | Biebl et al. | 73/514.36 |
| 5,447,067 | 9/1995 | Biebl et al. | 73/514.32 |
| 5,472,916 | 12/1995 | Bertagnolli et al. | 437/228 |
| 5,596,194 | 1/1997 | Kubena | 250/306 |

FOREIGN PATENT DOCUMENTS

| | | |
|---|---|---|
| 40 22 464 | 1/1992 | Germany . |
| 42 14 400 | 12/1992 | Germany . |
| WO 92/03740 | 5/1992 | WIPO . |

OTHER PUBLICATIONS

Applied Physics Letters 58, Micromachined Silicon Tunnel Sensor for Motion Detection, T.W. Kenny et al, Jan. 7, 1991, pp. 100–102.

J. Vac Sci Technol. A10, (4), Electron Tunnel Sensors, T.W. Kenny et al, Jul./Aug. 1992, pp. 2114–2118.

*Primary Examiner*—Christine K. Oda

[57] ABSTRACT

The tunnel effect acceleration sensor has a mass part (4) movable at springs (5) fashioned in a sensor layer (1), particularly a monocrystalline silicon layer of an SOI substrate. A tunnel electrode (6) and a cooperating electrode (7) are arranged lying opposite one another in the plane of this sensor layer (1). One of these electrodes (6,7) is attached to the mass part (4) and one is firmly connected to the substrate. Compensation electrodes (8,9) are present for the electrostatic positioning of the mass part (4).

10 Claims, 4 Drawing Sheets

TUNNEL EFFECT SENSOR

BACKGROUND OF THE INVENTION

The present invention is directed to a tunnel effect sensor, particularly an acceleration sensor on silicon.

Modern navigation systems require small, easily manufactured and reliable acceleration sensors with a measuring precision down into the range of one one-millionth of the earth's acceleration. Given other sensors such as, for example, given microphones and pressure sensors as well, it is necessary to determine a temporally variable path difference with extremely high precision given movably attached parts. This is possible upon exploitation of the tunnel effect. In sensors of this type as disclosed, for example, by T. W. Kenny et al. in Applied Physics Letters 58, 100 through 102 (1991) and J.Vac.Sci.Technol. A10 (4), 2114 through 2118 (1992), the tunnel effect between a tip arranged at a movable beam and the silicon substrate is exploited for the measurement.

SUMMARY OF THE INVENTION

An object of the present invention is to specify an easily manufactured tunnel effect sensor whose tunnel tip is protected against destruction with the voltage turned off and that can measure both positive as well as negative forces in sensitivity direction, particularly for monolithic integration with electronic function elements, and to specify an appertaining manufacturing method.

In general terms the present invention is a tunnel effect sensor having a mass part movable at springs that are fashioned in a sensor layer. A tunnel electrode and a cooperating electrode are arranged lying opposite one another in the plane of this sensor layer. Only one of these electrodes is arranged at the mass part. Compensation electrodes are present, these being arranged such that the mass part can be held in a predetermined position by an electrical voltage applied to these compensation electrodes.

Advantageous developments of the present invention are as follows.

The sensor layer is silicon.

The sensor layer is the silicon layer of an SOI substrate

The sensor layer is composed of a conductive material.

The sensor layer is composed of a plurality of layers.

The tunnel electrode is secured to the mass part.

The cooperating electrode is secured to the mass part.

The tunnel electrode and the cooperating electrode are located at an enlarged spacing from one another in the currentless quiescent condition of the mass part. The compensation electrodes are arranged such that, by applying a provided voltage, the mass part can be brought into a position in which the tunnel electrode and the cooperating electrode are located at a spacing from one another provided for a measurement.

Electronic function elements are monolithically integrated The electronic function elements contain a circuit with which such a great electrical voltage is respectively applied to the compensation electrodes that forces of inertia acting on the mass part (4) are electrostatically compensated The present invention is also a method for the manufacture of a sensor of the type described above whereby the electronic function elements are first produced in the silicon layer of the SOI substrate This silicon layer is then structured as a sensor layer in a region provided for the sensor. The insulator layer of the SOI substrates is then removed in this region at least to an extent required for the mobility of the mass part.

The inventive tunnel effect sensor utilizes the possibility of measurements of the minutest path differences in the range of a few $10^{-10}$ meters using the tunnel effect. The sensor is composed of a mechanically movable structure with a mass part suspended at springs. This structure is attached layer-like over a substrate and is anchored on this substrate. Given acceleration of the substrate, the mass part shifts relative to the substrate due to its inertia. An electrode is connected to the mass part, this electrode residing so close opposite an electrode secured to the substrate that a current flows between these electrodes due to the tunnel effect when a voltage is applied. Given occurrence of an acceleration and, thus, movement of the mass part, a change in the spacing between these electrodes arises and a change of the tunnel current to be measured arises as a result thereof Since the tunnel current already varies greatly given the minutest changes in spacing, the minutest accelerations or forces can be detected with this method.

In the inventive sensor, the tunnel electrodes are preferably fashioned as pointed tunnel electrode with cooperating electrode lying there opposite in the layer plane of the mass part. The inventive sensor has further electrodes available to it, whereof one or more are rigidly connected to the substrate and further electrodes are rigidly connected to the mass part and are arranged lying opposite one another such that the position of the mass part relative to the substrate can be varied by applying an electrical voltage. These additional electrodes can, for example, act as compensation electrodes when such a great voltage is applied to the mass part at every point in time that forces of inertia attacking the mass part are constantly compensated The compensation electrodes can also serve the purpose of bringing the mass part into an initial position provided for the measurement. The mass part can then be attached such that it assumes a position in a currentless quiescent condition wherein the tunnel electrode and the cooperating electrode comprise such a great spacing that jolts of the sensor do not lead to damage to these electrodes. The mass part is displaced and electrostatically held such that the spacing between the tunnel electrode and the cooperating electrode is slight enough for the occurrence of a tunnel current only given a measurement, being displaced by applying a suitable potential to the compensations electrodes The arrangement of all electrodes in the layer plane of the planar mass part enables a simple manufacture of the sensor. In particular, the thin silicon layer of an SOI substrate can be used for the sensor structure Electronic function elements can be monolithically integrated in such an SOI substrate The circuit for the evaluation of the measurement and, potentially, the circuit provided for the compensation of the forces of inertia can therefore be integrated together with the sensor.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
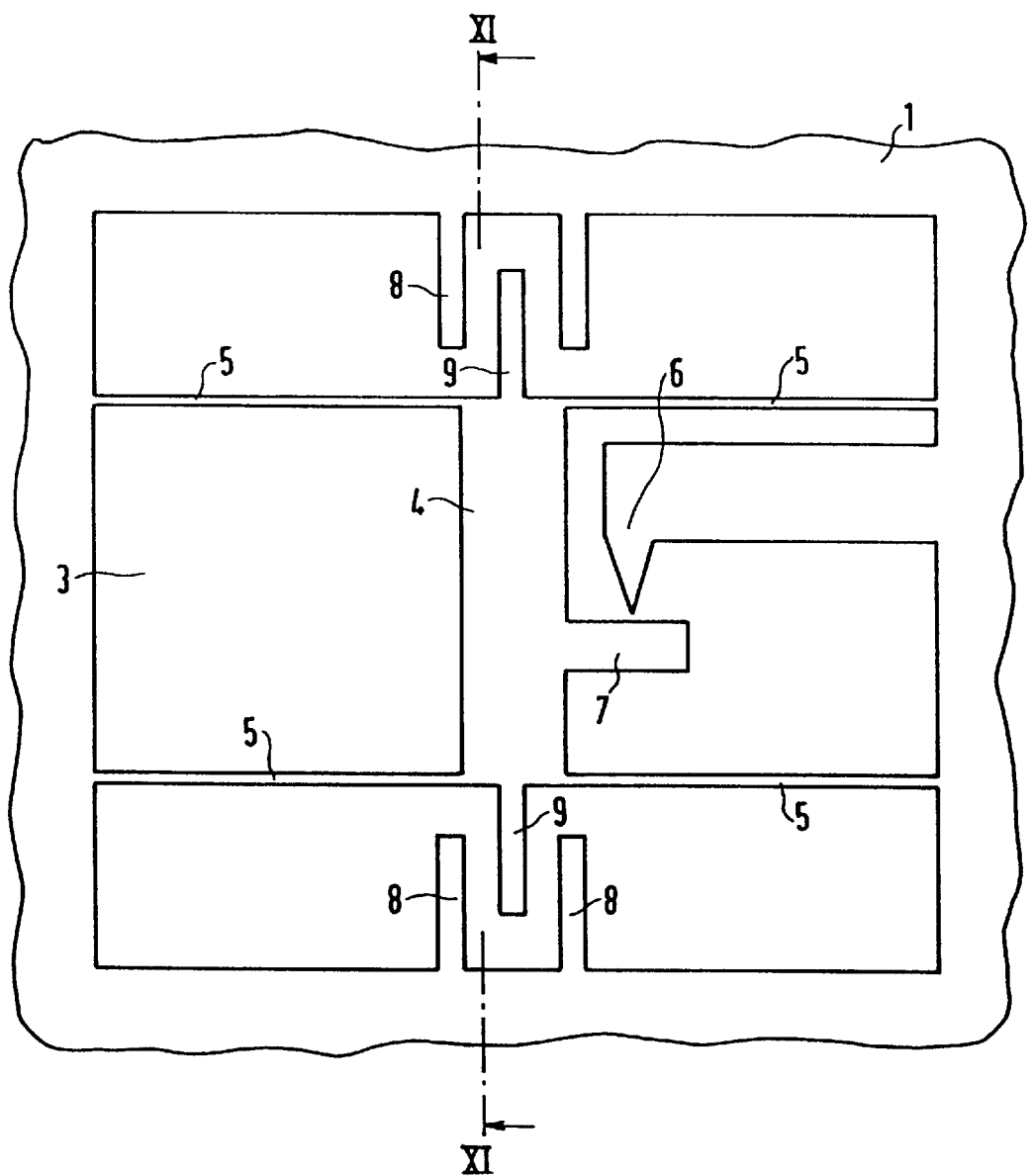
FIGS. 1 through 3 show various embodiments of the sensor in plan view.

FIG. 1 shows a first exemplary embodiment of the inventive sensor in plan view. The sensor is structured in a sensor layer 1 The movably arranged mass part 4 is suspended at springs 5. The cooperating electrode 7 for the tunnel electrode 6 is situated at this mass part 4, said cooperating electrode 7 being firmly connected to the surrounding part of the sensor layer 1 and, thus, firmly connected to the substrate. The tunnel electrode 6 is fashioned as a tunnel tip. This tunnel tip can also be attached to the mass part 4; the cooperating electrode is then firmly connected to the rest of the sensor layer 1. The compensation electrodes 8,9 are likewise shown. The electrodes 8 are also firmly connected to the main part of the sensor layer 1, whereas the cooperating electrodes 9 are secured to the mass part 4. In this exemplary embodiment, the electrodes 9 connected to the mass part 4 are respectively arranged such between two firmly attached electrodes 8 that a displacement of the mass part 4 in longitudinal direction of the electrodes is effected by electrostatic forces. The spacing between tunnel electrode 6 and cooperating electrode 7 can thus be set. The sensor layer 1 can be formed by a layer of only one material or of only one material combination or can be composed of a plurality of layers. The sensor layer 1 can be composed of electrically conductive material For example, the sensor layer 1 can be silicon, particularly the monocrystalline, thin layer of an SOI substrate The insulator layer is then removed in the region of the mass part 4 in order to achieve free mobility of the mass part 4. The substrate 3 may be seen thereat in the plan view.

Figure 2:
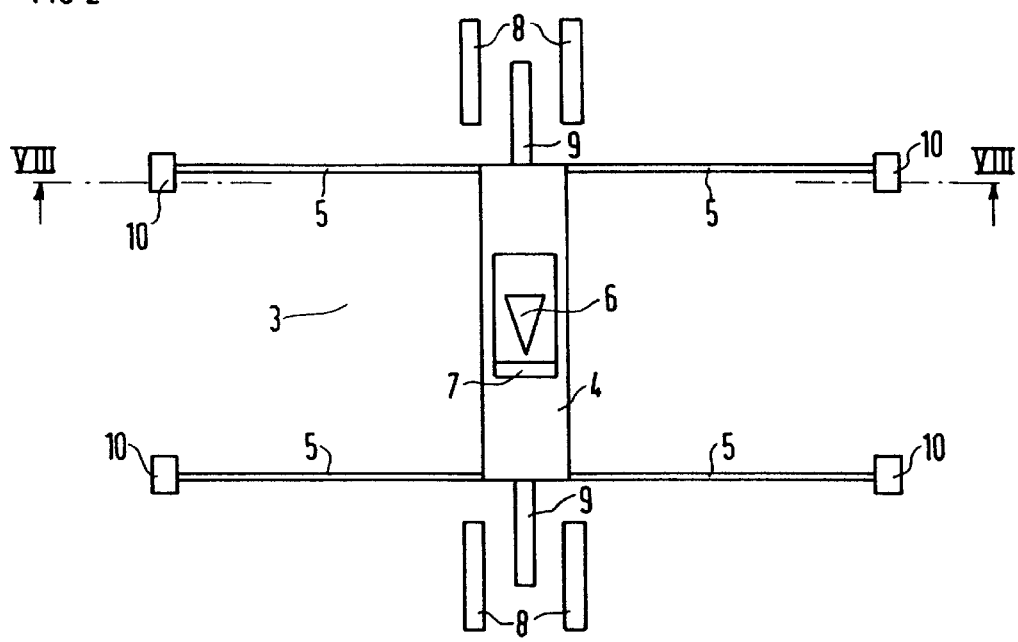

FIG. 2 shows an alternative exemplary embodiment wherein the movable mass part 4 of the sensor layer, the compensation electrodes 9 attached thereto and the spring 5 are present. The springs 5 are secured on the substrate 3 with anchorings 10 at that end lying opposite the mass part 4. The tunnel electrode 6 and the firmly attached compensation electrodes 8 are likewise attached on the substrate 3. The cooperating electrode 7 is fashioned at the mass part 4. The sensor layer, from which the mass part 4, the springs 5, the compensation electrodes 9 and, potentially, the tunnel electrode 6 are formed, can here also be the remainder of a single-crystal silicon layer of an SOI substrate or a silicon layer that was manufactured with one of the methods described below. Here, too, all electrodes are arranged in the layer plane of the planar mass part 4. As shown, for example, the tunnel electrode 6 can be arranged in a recess of the mass part 4 or can be arranged as in FIG. 1.

Figure 3:
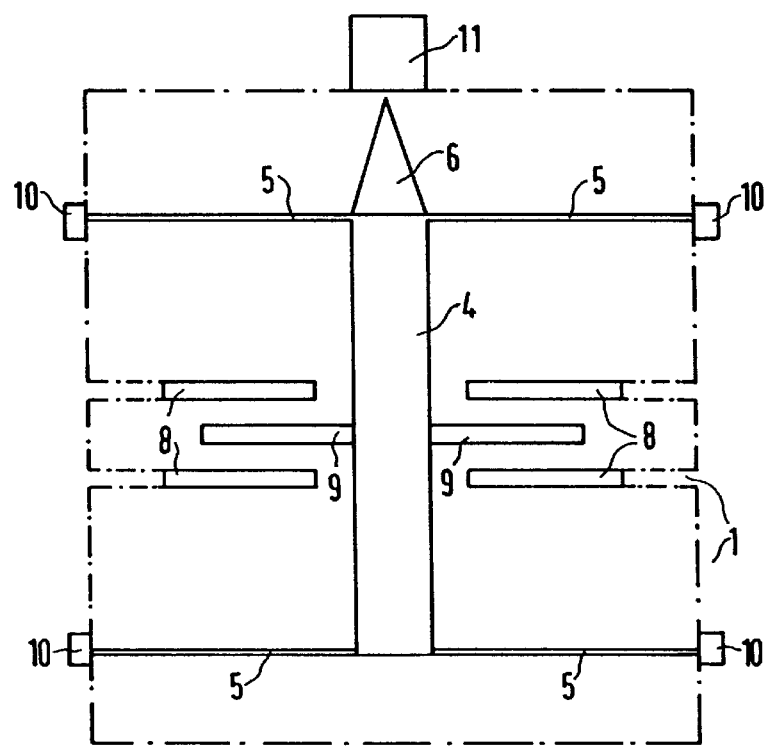
Figure 4:
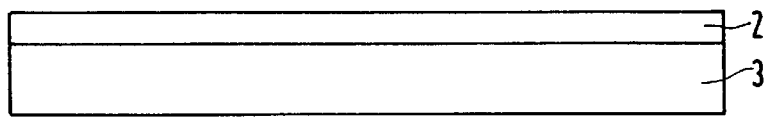
FIGS. 4 through 8 or, respectively, 9 through 11 show inventive sensors in crossection after various steps of the manufacturing process.
Figure 5:
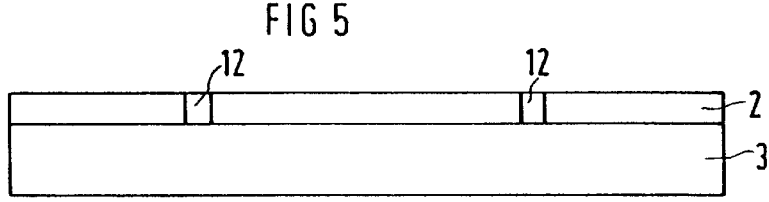
Figure 6:
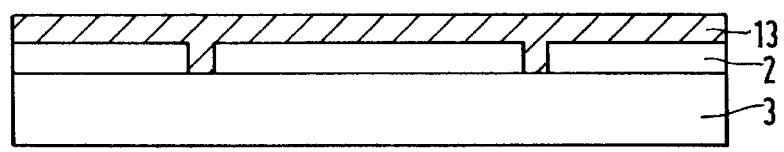
Figure 7:
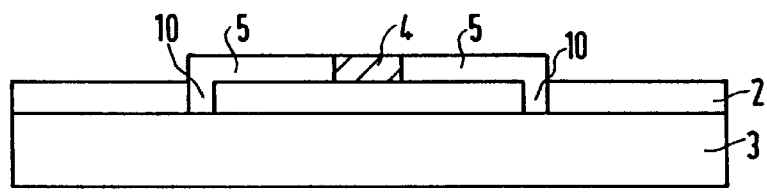
Figure 8:
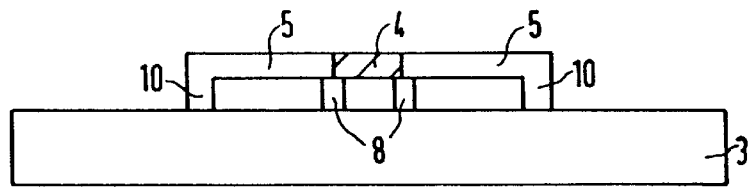

FIG. 3 shows two alternative embodiments wherein the tunnel electrode 6 is fashioned as an end of the mass part 4 tapering to a point. The springs 5 and the compensation electrodes 8,9 are again shown. Here, the cooperating electrode is firmly attached on the substrate opposite the tunnel tip. The springs 5 can be secured on the upper substrate side with anchorings 10. The boundary entered with dot-dash lines in FIG. 3 shows the alternative embodiment with surface-wide sensor layer 1 from which the sensor was structured. The cooperating electrode 11 is then situated at or in the part of the sensor layer 1 firmly attached on the substrate. For example, this sensor layer 1 can be the single-crystal, uppermost layer of an SOI substrate. The compensation electrodes 8 connected thereto are likewise part of the sensor layer 1 and are located on remaining parts of the insulator layer. The insulator layer between the silicon layer and the substrate is removed in that region in which the mass part 4 must be movable Given a suitable arrangement, the compensation electrodes 8,9 can serve the purpose of bringing the spacing between the tunnel electrode 6 and the cooperating electrode 7 to the low operating spacing of a few nanometers only during operation of the sensor. In the currentless, quiescent condition, the mass part 4 can then be arranged such that the spacing between the tunnel electrode 6 and the cooperating electrode 7 is so large that the sensor is not damaged by potentially occurring accelerations and the striking of the tunnel tip against the cooperating electrode connected therewith.

The compensation electrodes 8,9 can also be arranged and aligned such that, given application of a suitable voltage to these electrodes, the electrostatic force can also be employed for compensating the force of inertia attacking at the mass part 4 that occurs given an acceleration of the substrate and for always keeping the spacing of the tunnel electrode from the cooperating electrode constant in this way. The difference between the voltage required therefor and the voltage in the unaccelerated case is then a direct measure for the acceleration to be measured. Since only attractive forces take effect between the compensation electrodes 8,9, it is provided that such compensation electrodes be arranged in various alignments, so that the accelerating forces in various directions in the sensor plane can be measured. For example, the electrodes for the compensation of the accelerating force can be arranged parallel or perpendicular to the principal sensitivity direction of the acceleration sensor. In the case of both-sided force compensation, the movable structure is held such by two oppositely acting electrostatic forces that the desired spacing of the tunnel electrode 6 from the cooperating electrode 7 is set. The compensation electrode 8 firmly connected to the substrate is either part of the sensor layer 1 or of an additional layer deposited on the substrate The circuits that supply the electrical voltages and evaluate the measured results can be monolithically integrated given the inventive sensor. The production of such an integration is especially advantageous in an SOI substrate upon employment of CMOS techniques and the technology for micromechanics. After the manufacture of the transistors and of other electronic function elements required for the circuit in a monocrystalline silicon layer, this silicon layer is structured for the sensor in the region provided for the sensor. In this way, both the electronic circuits as well as the mechanical sensor components can be integrated in a silicon layer of an SOI substrate.

FIGS. 4 through 8 show an inventive sensor after various steps of the manufacturing process. An auxiliary layer 2 of, for example, silicon oxide is deposited surface-wide on a substrate 3 (see FIG. 4). Openings 12 are provided in this auxiliary layer 2 at the places provided for anchorings (see FIG. 5). After this, a layer 13 of, for example, polysilicon or monocrystalline silicon is deposited surface-wide according to FIG. 6. This layer 13 is structures according to the sensor to be manufactured, so that the mass part 4, the springs 5 and the anchorings 10 remain from this layer 13 according to FIG. 7. The auxiliary layer 2 is then removed, and the structure of FIG. 8 that corresponds to the view in FIG. 2 is obtained The plane of section of the layer 13 corresponding to this view is respectively indicated by shading in FIGS. 6 through 8.

Figure 9:
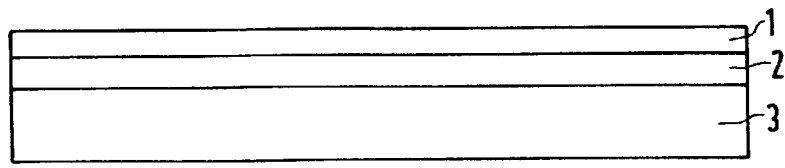
Figure 10:
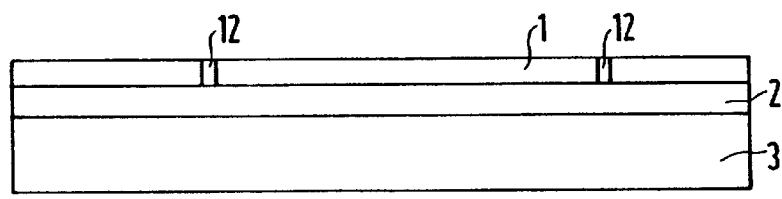
Figure 11:
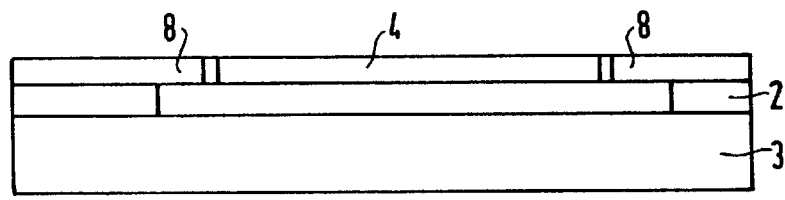

The manufacture takes on a simpler form when one proceeds on the basis of an SOI substrate Such a substrate is shown in crossection in FIG. 9. An insulator layer 2 of, for example, oxide is located on the actual substrate 3, and a monocrystalline silicon layer 1 that is provided as sensor layer is located on said insulator layer 2. This SOI substrate is potentially structured and, for example, doped by ion implantation. The structure of the movable part is then transferred onto the upper, monocrystalline layer 1, for example with a lithography process, and is etched out, for example by a dry etching, so that the openings 12 entered in FIG. 10 derive in the silicon layer 1. Potentially, the cooperating electrode is also applied, or metallizations for the provided electrodes are deposited, which can ensue, for example, vapor deposition through, potentially, an occlusion mask. The electrical properties of the electrodes can be improved by the metallizations. In any case, it is advantageous when at least the tunnel electrode is coated with a metal layer. According to FIG. 11, the movable structure is subsequently freed through the openings 12 by selectively etching off the insulator layer 2 located under the monocrystalline silicon layer 1, for example by HF-etching. The crossection shown in FIG. 11 corresponds to the view entered in FIG. 1 Upon removal of the oxide of the insulator layer 2 under the mechanically freely movable parts, too great an under-etching in adjoining regions can be avoided, for example, by a trench etching through the insulator layer 2 and subsequent filling with, for example, polysilicon.

Figure 12:
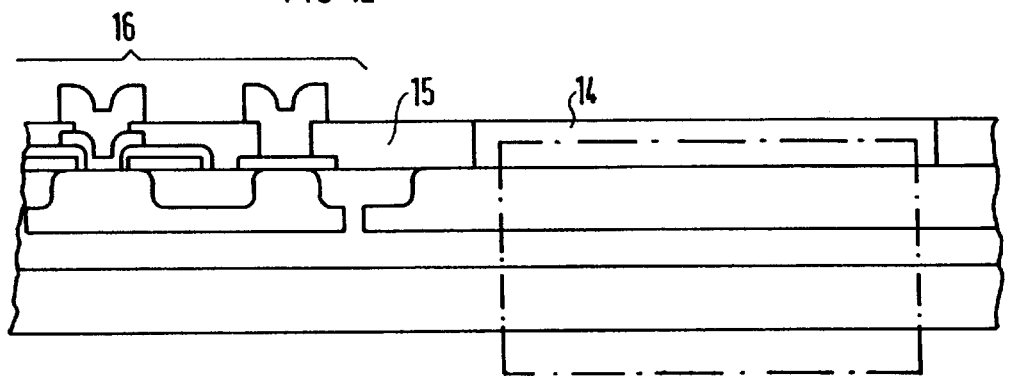
FIG. 12 shows a crossection of a sensor monolithically integrated with electronic function elements.

Given a monolithic integration of the drive circuits, the corresponding electronic function elements 16 (see FIG. 12) are first manufactured in a region of the monocrystalline silicon layer 1 with the methods of silicon technology When the monocrystalline silicon layer 1 (of, for example, the SOI substrate) is covered surface-wide with a cover layer or passivation layer 15 following this manufacturing process, an opening 14 is produced therein in the region of the sensor to be manufactured. The silicon layer 1 is exposed in this opening 14. One then proceeds according to FIGS. 9 through 11 in the portion entered dot-dashed in FIG. 12.

Advantages of the inventive sensor are the far, far higher precision, an extremely great range of measurement, very low signal noise, extremely low sensitivity in directions transverse to the measuring direction, the possibility of utilizing modern process technologies, insensitivity to disturbance due to internal signal processing and possible digitization, small dimensions, low weight and great bandwidth due to the minutest masses A particular advantage is the possible monolithic integration of electronic and mechanical components and the application of standard processes of VLSI technology.

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. Tunnel effect sensor having a substrate, comprising:

a mass part, movable on springs, the mass part being a sensor layer and being movable parallel to a surface of the substrate;

a tapering tunnel electrode and a cooperating electrode lying opposite one another in a plane of said sensor layer, the springs also being in the plane of the sensor layer;

only one of said tunnel electrode and said cooperating electrode arranged at the mass part; and compensation electrodes that are arranged such that the mass part can be held in a predetermined position by an electrical voltage applied to said compensation electrodes.

2. The sensor according to claim 1, wherein the sensor layer is silicon.

3. The sensor according to claim 2, wherein the sensor layer is a silicon layer of an SOI substrate.

4. The sensor according to claim 1, wherein the sensor layer is composed of a conductive material.

5. The sensor according to claim 1, wherein the sensor layer is composed of a plurality of layers.

6. The sensor according to claim 1 wherein the tunnel electrode is secured to the mass part.

7. The sensor according to claim 1, wherein the cooperating electrode is secured to the mass part.

8. The sensor according to claim 1, wherein the tunnel electrode and the cooperating electrode are located with an enlarged spacing from one another in a currentless quiescent condition of the mass part; and wherein the compensation electrodes are arranged such that, by applying a predetermined voltage, the mass part is brought into a position in which the tunnel electrode and the cooperating electrode are located at a spacing from one another provided for a measurement.

9. The sensor according to claim 1, wherein electronic function elements are monolithically integrated with the sensor.

10. The sensor according to claim 9, wherein the electronic function elements contain a circuit with which such a great electrical voltage is respectively applied to the compensation electrodes that forces of inertia acting on the mass part are electrostatically compensated.

* * * * *